United States Patent
Huang et al.

(10) Patent No.: US 6,842,195 B2
(45) Date of Patent: Jan. 11, 2005

(54) DEVICE FOR TRANSFORMING COMPUTER GRAPHICS SIGNALS TO TELEVISION VIDEO SIGNALS

(75) Inventors: Yi-Chieh Huang, Taipei (TW); Chun-An Lin, Changhua (TW)

(73) Assignee: VIA Technologies, Inc., Taipei (TW)

( * ) Notice: Subject to any disclaimer, the term of this patent is extended or adjusted under 35 U.S.C. 154(b) by 600 days.

(21) Appl. No.: 09/964,847

(22) Filed: Sep. 28, 2001

(65) Prior Publication Data

US 2002/0039147 A1 Apr. 4, 2002

(30) Foreign Application Priority Data

Sep. 29, 2000 (TW) ...................................... 89120324 A

(51) Int. Cl.[7] ............................ H04N 11/20; H04N 7/01

(52) U.S. Cl. ..................... 348/446; 348/441; 348/458

(58) Field of Search ............................... 348/446, 441, 348/443, 447, 458; H04N 11/20, 7/01

(56) References Cited

U.S. PATENT DOCUMENTS

| | | | | |
|---|---|---|---|---|
| 5,485,280 A | * | 1/1996 | Fujinami et al. | 386/123 |
| 5,781,241 A | * | 7/1998 | Donovan | 348/441 |
| 5,850,263 A | * | 12/1998 | Tauchi | 348/459 |
| 5,912,711 A | * | 6/1999 | Lin et al. | 348/446 |
| 6,023,262 A | * | 2/2000 | Eglit | 345/667 |

* cited by examiner

*Primary Examiner*—Michael H. Lee
*Assistant Examiner*—Trang U. Tran
(74) *Attorney, Agent, or Firm*—Rabin & Berdo, P.C.

(57) ABSTRACT

A transforming device for transforming computer graphics signals to television signals is provided. The transforming device includes a scaled-down line generating unit that receives the computer vertical line and generates the scaled-down vertical line, a controller that receives the scaled-down vertical line, and a scaled-down buffer that stores the scaled-down vertical line or the value of the scaled-down vertical line performed by the weighted-averages method. The content of the scaled-down buffer is transmitted to a weighted-averages operation unit, and then it is performed by the weighted-averages method with the next scaled-down vertical line. When a TV line is generated, it is the output of the transforming device. The present invention has the advantage of reducing the needed buffers in the transforming process and thereby reducing the cost.

6 Claims, 11 Drawing Sheets

DEVICE FOR TRANSFORMING COMPUTER GRAPHICS SIGNALS TO TELEVISION VIDEO SIGNALS

This application incorporates by reference of Taiwan application Serial No. 089120324, Filed Sep. 29, 2000.

BACKGROUND OF THE INVENTION

1. Field of the Invention

The invention relates in general to a signal-transforming device for transforming computer graphics signals to television signals, and more particularly to a signal-transforming device, which can reduce the needed buffers in the process of transforming computer graphics signals to television video signals.

2. Description of the Related Art

In the present post-PC eras, Information Appliance (IA) plays a more and more important role. Many activities, which are generally enjoyed on personal computers (PC) in the past, such as Internet surfing, can currently be enjoyed on some specified-purpose devices, such as set-top box etc. The television is the most popular device for image output in the family. Consequently, in order to make miscellaneous information appliances prevalent in every family, the images originally displayed on the PC should also be able to be displayed on the television. That is to say, the computer graphics signals should be transformed, making it consistent with the standards of the television video signals, and then can be displayed on the television.

The television video signals differ from the computer graphics signals, such as dimensions and interlacing or not. There are different standards for television video signals, such as NTSC, PAL, and so on. Take NTSC for example, there are totally 525 vertical lines, and approximately 420 ones among them are in the displayed area, depending on the type of the television. However, the resolution of the PC is 640×480, 800×600 and so on. Therefore, the computer graphics signal should be scaled down first and then can be displayed on the television.

On the other hand, the way of television display adopts the method of interlace scanning. That is to say, every frame of the television video signals is composed of one even field and on odd field. In the even field, every other TV line is scanned, as shown in FIG. 1A; in the odd field, the TV line between the two TV lines in the even field is scanned, as shown in FIG. 1B. After the scanning of the even field is completed, the scanning of the odd field is then proceeded, completing one full frame. However, the way of computer display adopts the method of Non-Interlace scanning. In every frame, every computer vertical line is scanned one by one, shown as FIG. 1C.

Therefore, in order to be displayed on the television, the computer graphics signals must go through two-step signal processing. The first step is to scale down the computer graphics signals. Take the 640×480 computer graphics signals and the NTSC television for example, the number of the computer vertical lines is 480 and that of the TV lines is 420, with the ratio 8:7. That is to say, in order to conform to the standards of the TV, every 8 vertical lines of computer graphics signals should be scaled down to the corresponding 7 TV lines of television video signals. In order to improve the video quality, conventionally the weighted-averages method is used for down scaling. Referring to FIG. 2, which shows the block diagram of the conventional scaling down operation for computer graphics signals. Every scaled-down vertical line L'(n) is obtained from two vertical lines of computer graphics signals by using the weighted averages method, i.e.

$$L'(n)=a(n)L(n)+b(n)L(n+1), \text{ wherein } a(n)+b(n)=1. \quad (1)$$

As shown in FIG. 2, L'(0)=L(0)+0*L(1), L'(1)=(6/7)L(1)+(1/7)L(2), L'(2)=(5/7)L(0)+(2/7)L(1), and the rest may be deduced by analogy.

Then, what follows is the second step operation, that is, interlacing the scaled-down computer graphics signals to individually produce the TV lines of the even and odd field. By doing so, the transformation of computer graphics signals to television video signals is completed, as shown in FIG. 3 Conventionally one TV line is obtained from three adjacent scaled-down vertical lines of computer graphics signals by using the weighted-averages method. The relationship between the TV line L"(n) and the scaled-down vertical line L'(n), L'(n+1), L'(n+2) is shown in the following equation.

$$L''(n)=\alpha L'(n)+\beta L'(n+1)+\gamma L'(n+2), \text{ wherein } \alpha+\beta+\gamma=1 \quad (2)$$

Referring to FIG. 4, which shows the block diagram of the conventional circuits for transforming computer graphics signals to television video signals. The initial buffers 402 and 404 store the data of the vertical lines of computer graphics signals. The scaled-down buffers 406, 408, and 410 store the data of the scaled-down vertical lines of computer graphics signals. The interlacing buffer 412 stores the data of the TV lines, which are obtained from interlacing the scaled-down vertical lines of computer graphics signals. After the two vertical lines stored in the initial buffers 402 and 404 go through the operation of the weighted-averages unit 414, the scaled-down vertical line is generated, which is then stored in the scaled-down buffers 406, 408, or 410 through the operation of the controller 416. Then, the scaled-down vertical lines stored in the scaled-down buffers 406, 408 and 410 go through the operation of the weighted-averages unit 418, and then one TV line is obtained. Then, the TV lines are stored in the interlacing buffer 412 and output as the TV lines of the odd or even field of the TV frame. (In general, all the TV lines of the even field are first obtained from all the vertical lines of one computer frame, and then all the TV lines of the odd field are obtained from all the vertical lines of the same computer frame.) Therefore, when the foregoing operations are performed in proper sequence to all vertical lines of one computer frame, the transformation of one frame of computer graphics signals to television video signals is completed.

Six buffers are totally needed in the conventional circuits for transforming computer graphics signals to television video signals. Take the computer vertical line, which includes 640 pixels, for example. If every pixel uses 1 byte memory space, then every buffer needs at least 640 bytes memory space. That is, six buffers need at least 3840 bytes memory space. In integrated circuit (IC) design, for the whole IC, the proportion of space and cost occupied by the memory is very high. Therefore, in the conventional method, the memory space needed for the six buffers is very large, and likewise the cost is very high. Therefore, it is necessary to find other methods to reduce the needed buffers in the transformation process.

SUMMARY OF THE INVENTION

It is therefore an object of the invention to provide a transforming device, which can reduce the needed buffers in the process of transforming computer graphics signals to television video signals. By effectively reducing the memory space needed for the buffers, the circuit size can be reduced and thereby the cost is substantially reduced.

According to the object of the invention, a transforming device for transforming computer graphics signals to television video signals is provided, which can transform many vertical lines of computer graphics signals to many TV lines of television video signals. The transforming device includes a first operating mode and a second operating mode. The transforming device includes a scaled-down vertical lines generating unit, a controller, a scaled-down buffer, a weighted-averages operation unit, and an interlacing buffer. The scaled-down vertical lines generating unit is employed to receive the computer vertical lines and then generate many scaled-down vertical lines, which include the scaled-down lines L'(n), L'(n+1) and L'(n+2). The controller is employed to receive the scaled-down vertical lines, which are output from the scaled-down lines generating unit. The initial value of the scaled-down buffer is the scaled-down line L'(n). In the second operating mode, after the scaled-down buffer outputs the content, the controller transmits the scaled-down vertical line L'(n+2) to the scaled-down buffer. The weighted-averages operation unit is employed to receive the content of the scaled-down buffer. In the first operating mode, the scaled-down buffer transmits the scaled-down vertical line L'(n) to the weighted-averages operation unit, and the controller transmits the scaled-down vertical line to the weighted-averages operation unit. Then, the weighted-averages operation unit outputs a first value and feeds it back to store in the scaled-down buffer. The first value is equal to $\alpha L'(n)+\beta L'(n+1)$. In the second operating mode, the weighted-averages operation unit receives the first value, which is transmitted from the scaled-down buffer, and the controller transmits the scaled-down vertical line L'(n+2) to the weighted-averages operation unit. The weighted-averages operation unit outputs a second value, which is equal to $\alpha L'(n)+\beta L'(n+1)+\gamma L'(n+2)$, wherein $\alpha+\beta+\gamma=1$. The interlacing buffer is employed to connect with the weighted-averages operation unit. In the second operating mode, the interlacing buffer receives the second value and regards it as the output of the transforming device.

BRIEF DESCRIPTION OF THE DRAWINGS

Other objects, features, and advantages of the invention will become apparent upon reading the following detailed description of the preferred but non-limiting embodiments. The description is made with reference to the accompanying drawings, in which.

DESCRIPTION OF THE PREFERRED EMBODIMENT

Figure 1A:
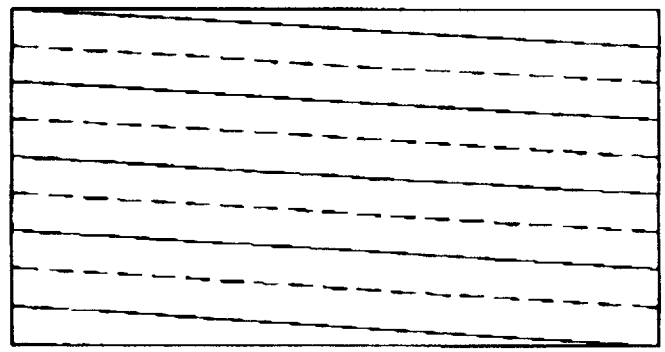
FIG. 1A is a diagram showing the scan lines of the even field of interlacing scanning, among which the real lines represent the scan lines of the even field and the dotted lines represent the scan lines of the odd field.
Figure 1B:
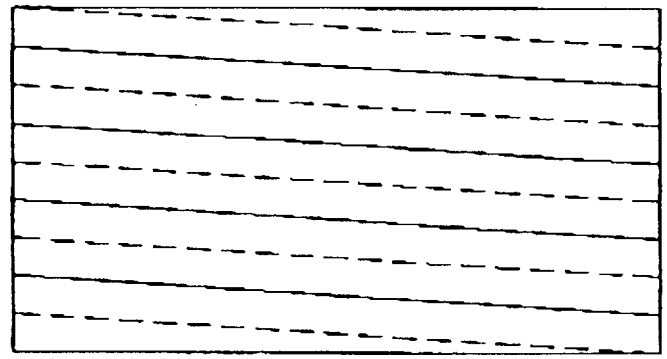
FIG. 1B is a diagram showing the scan lines of the odd field of interlace scanning, among which the real lines represent the scan lines of the odd field and the dotted lines represent the scan lines of the even field.
Figure 1C:
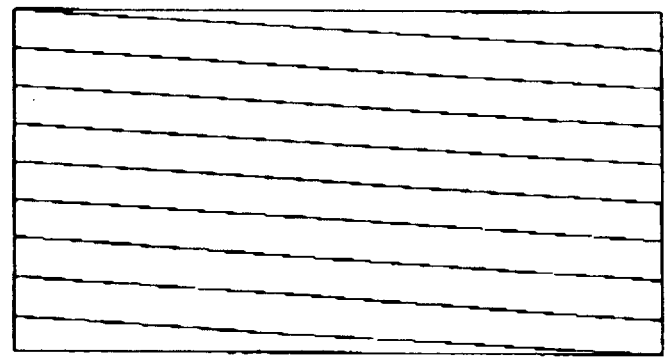
FIG. 1C is a diagram showing the scan lines of non-interlacing.
Figure 2:
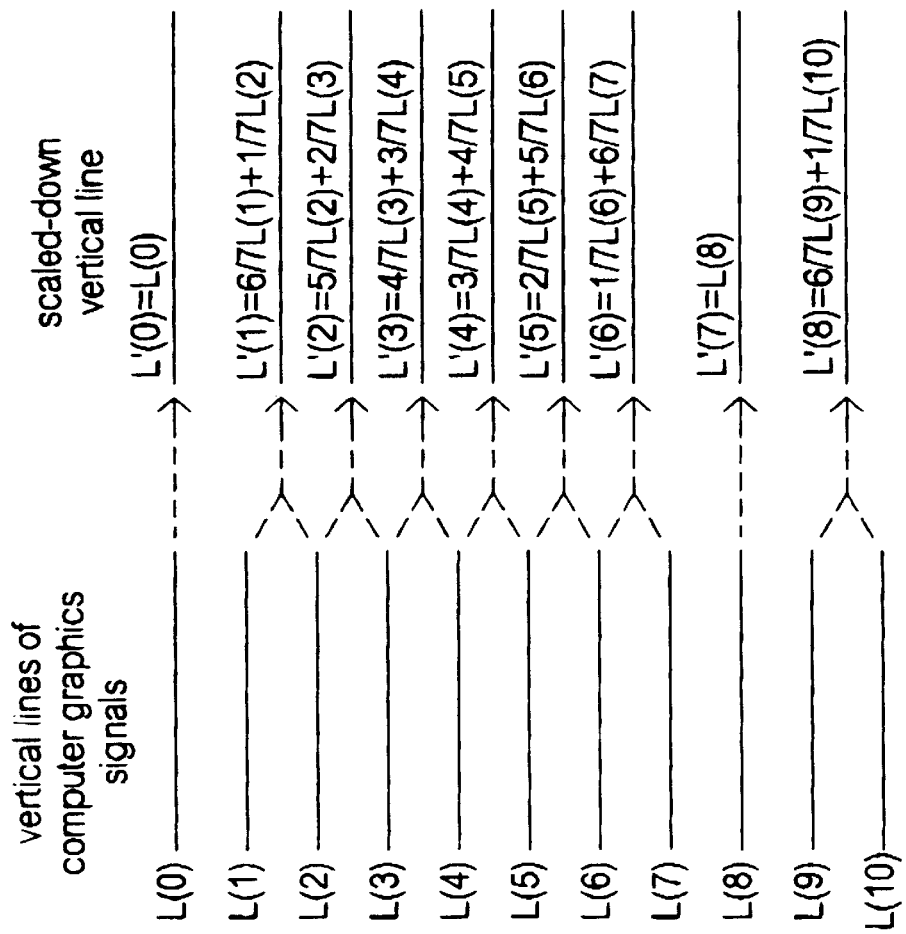
FIG. 2 is a diagram showing the conventional operation to scale down the vertical lines of computer graphics signals.
Figure 3:
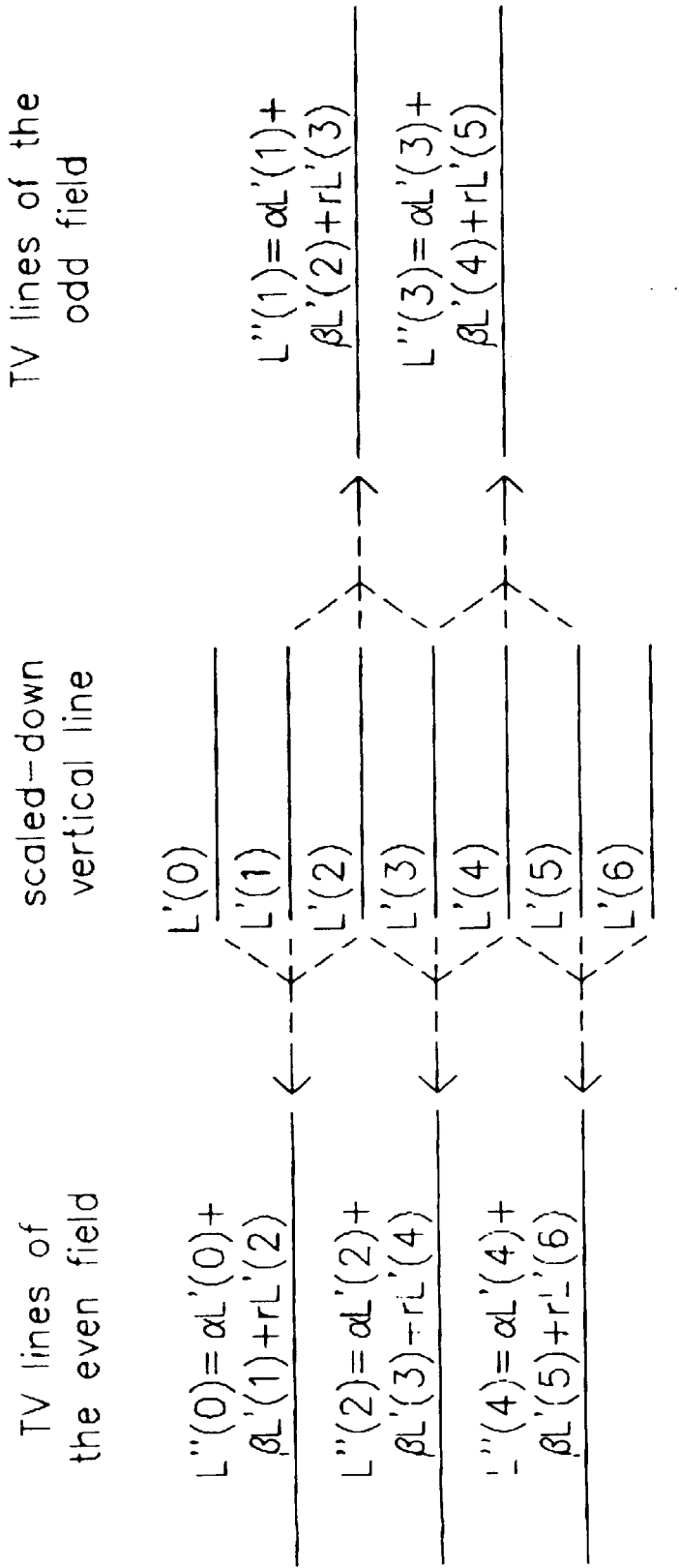
FIG. 3 is diagram showing the interlacing of the scaled-down vertical lines.
Figure 4:
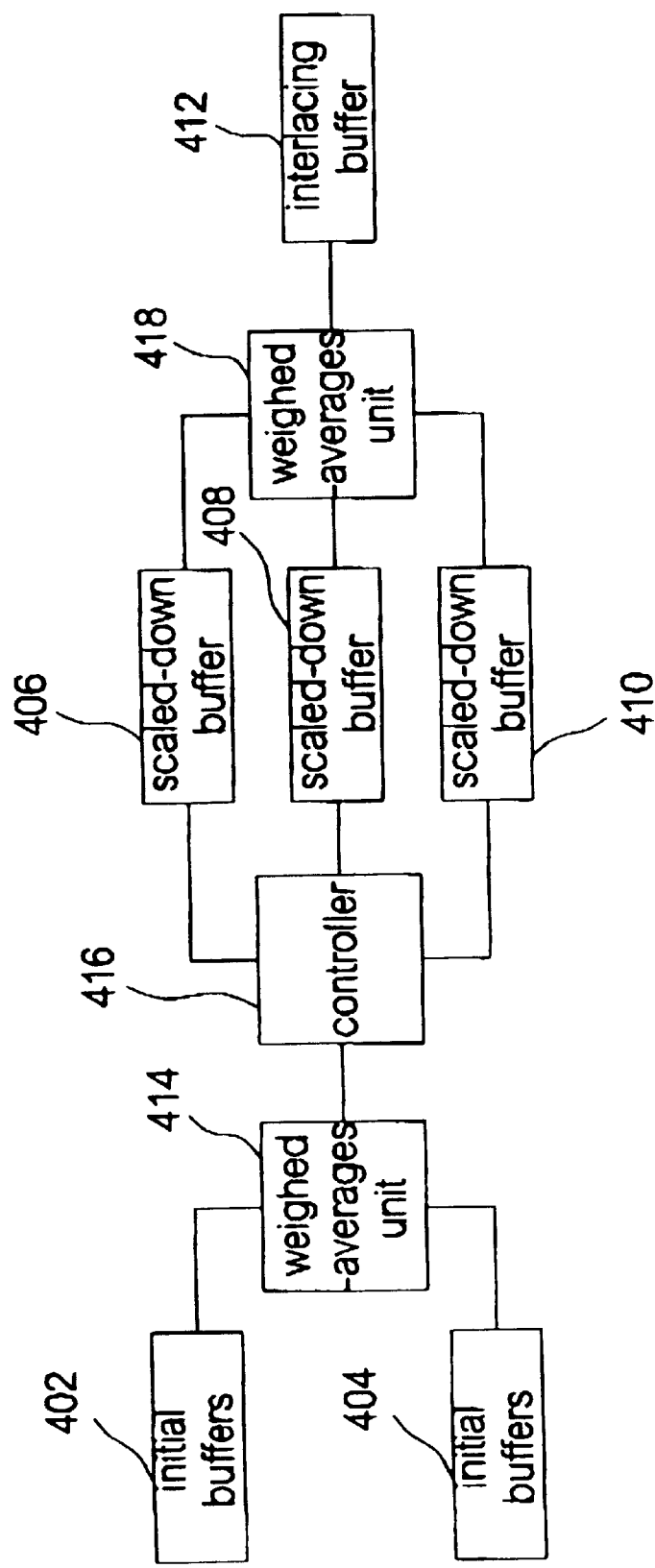
FIG. 4 is a block diagram showing the conventional circuits for transforming computer graphics signals to television video signals.
Figure 5:
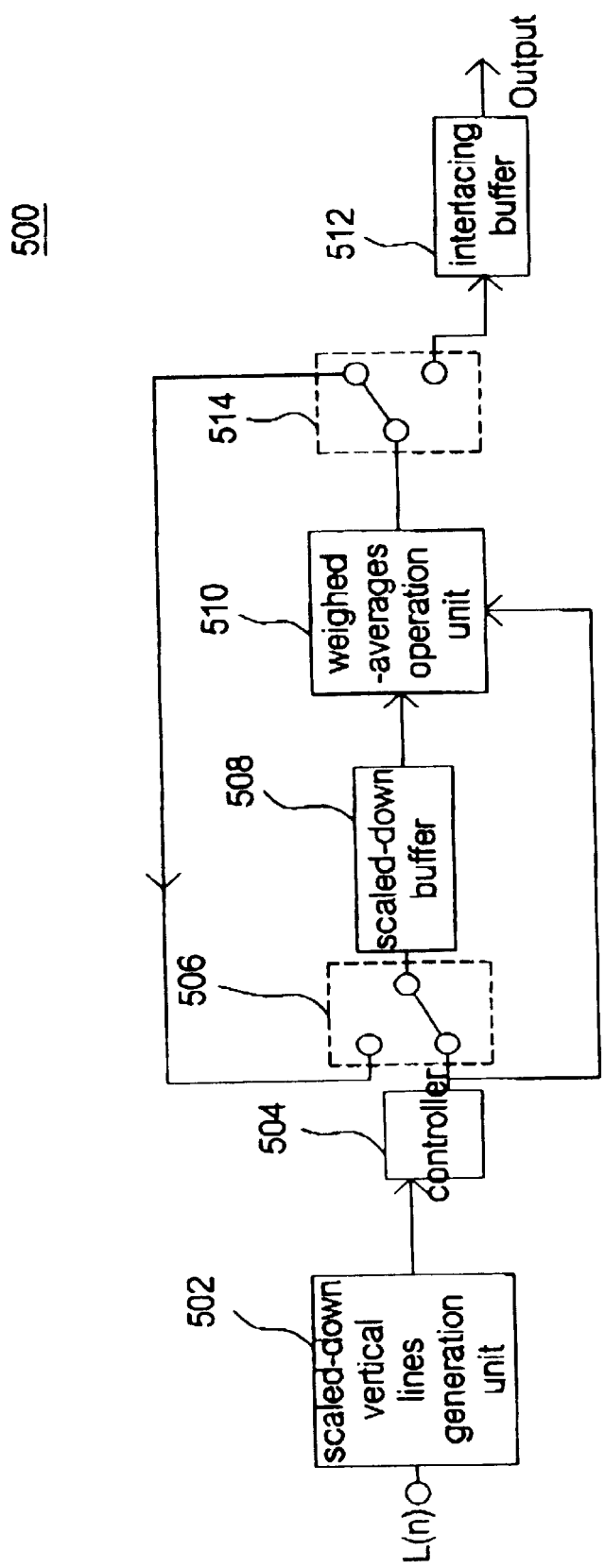
FIG. 5 is a block diagram showing the device for transforming computer graphics signals to television video signals in according to a preferred embodiment of the invention.

FIG. 5 is a block diagram showing the device 500, which transforms computer graphics signals to television video signals, according to a preferred embodiment of the present invention. The vertical line of computer graphics signals L(n) is input to the scaled-down vertical lines generating unit 502, and the scaled-down line, generated by the scaled-down vertical lines generating unit 502, is output to the controller 504. Then, the controller 504 inputs the scaled-down vertical line to the switch 506 and to the weighted-averages operation unit 510. The switch 506 is employed to control that the input of the scaled-down buffer 508 is the output of the controller 504 or the output of the switch 514. The weighted-averages operation unit 510 is connected to the switch 514. Under the control of the switch 514, the result generated by the weighted-averages operation unit 510 is output to the switch 506 or to the interlacing buffer 512.

FIGS. 6A~6E are the operating block diagrams of the transforming device 500 in FIG. 5. At first, referring to FIG. 6A, after the computer vertical lines L(n) and L(n+1) have been input to the scaled-down lines generating unit 502, the scaled-down lines production unit 502 outputs the scaled-down vertical line L'(n). Then, by means of controlling the switch 506, the controller 504 directly outputs the scaled-down line L'(n) to the scaled-down buffer 508. By doing so, the initial value of the scaled-down buffer is set.

Figure 6A:
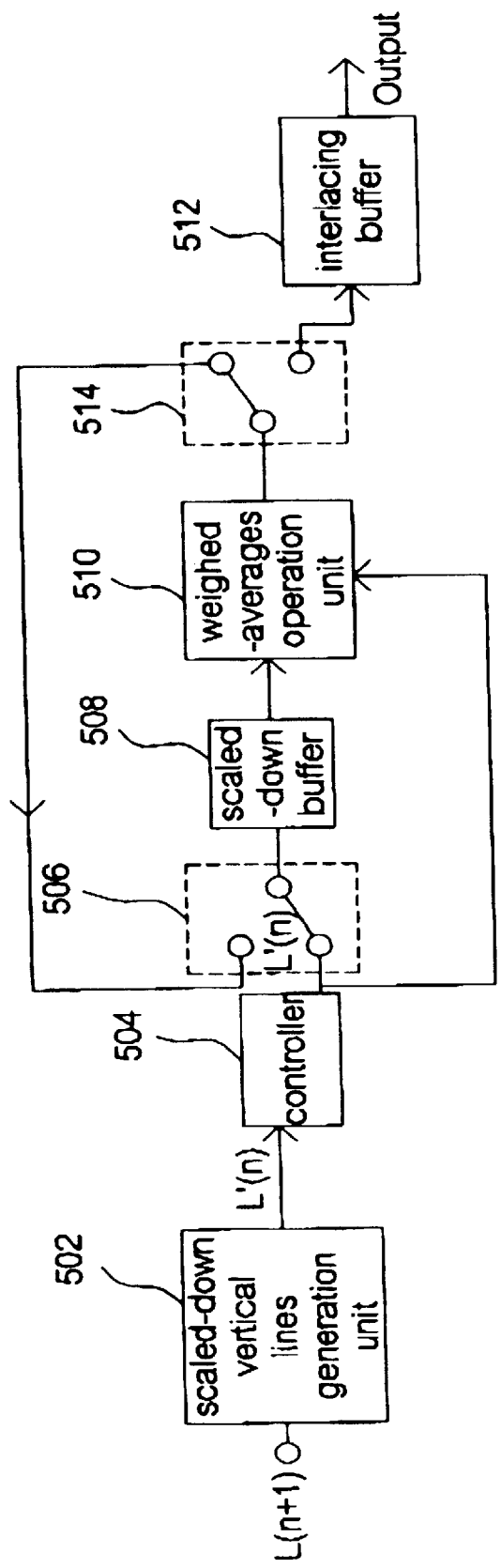
FIGS. 6A~6E are the operating block diagrams of the transforming device in FIG. 5.
Figure 6B:
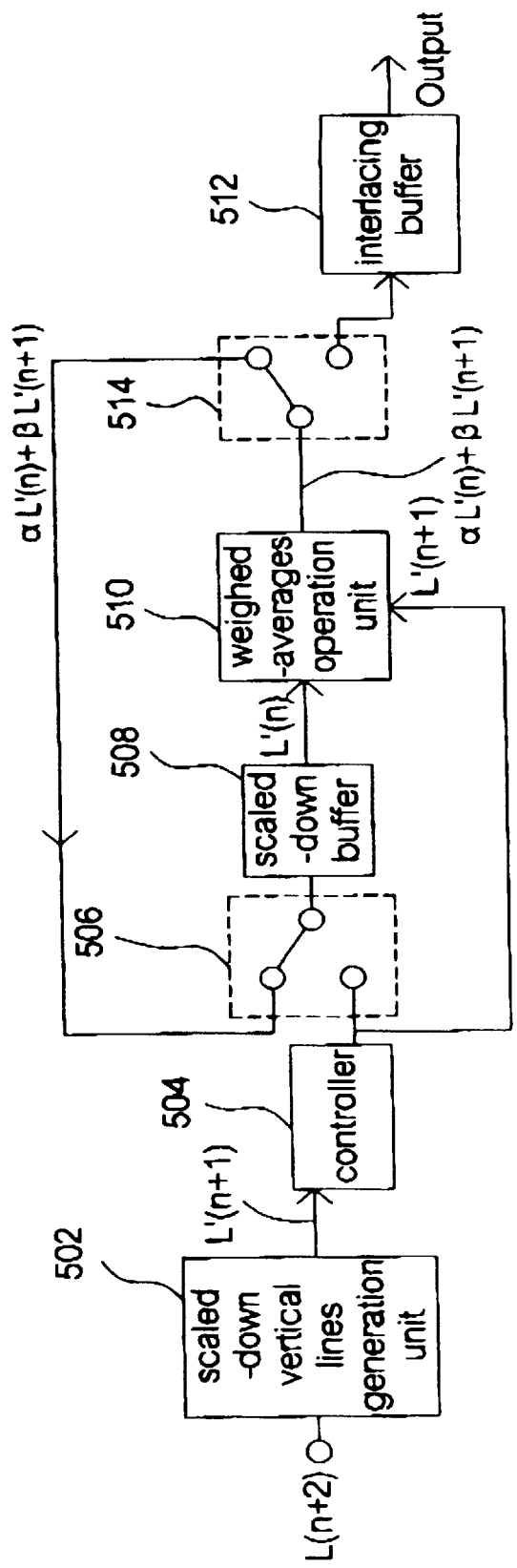

Then, referring to FIG. 6B, after the computer vertical lines L(n+2) has been input to the scaled-down lines generating unit 502, the scaled-down lines production unit 502 outputs the scaled-down vertical line L'(n+1). Then, the scale-down buffer 508 directly transmits the stored scaled-down line L'(n) to the weighted-averages operation unit 510. Simultaneously, the controller 504 directly outputs the scaled-down vertical line L'(n+1) to the weighted-averages operation unit 510. Then, the weighted-averages operation unit 510 performs the weighted-averages operation to the received scaled-down vertical lines L'(n) and L'(n+1), thereby obtaining the value of $\alpha L'(n)+\beta L'(n+1)$, which is then fed back to store in the scaled-down buffer 508 through the switch 514 and the switch 506.

Figure 6C:
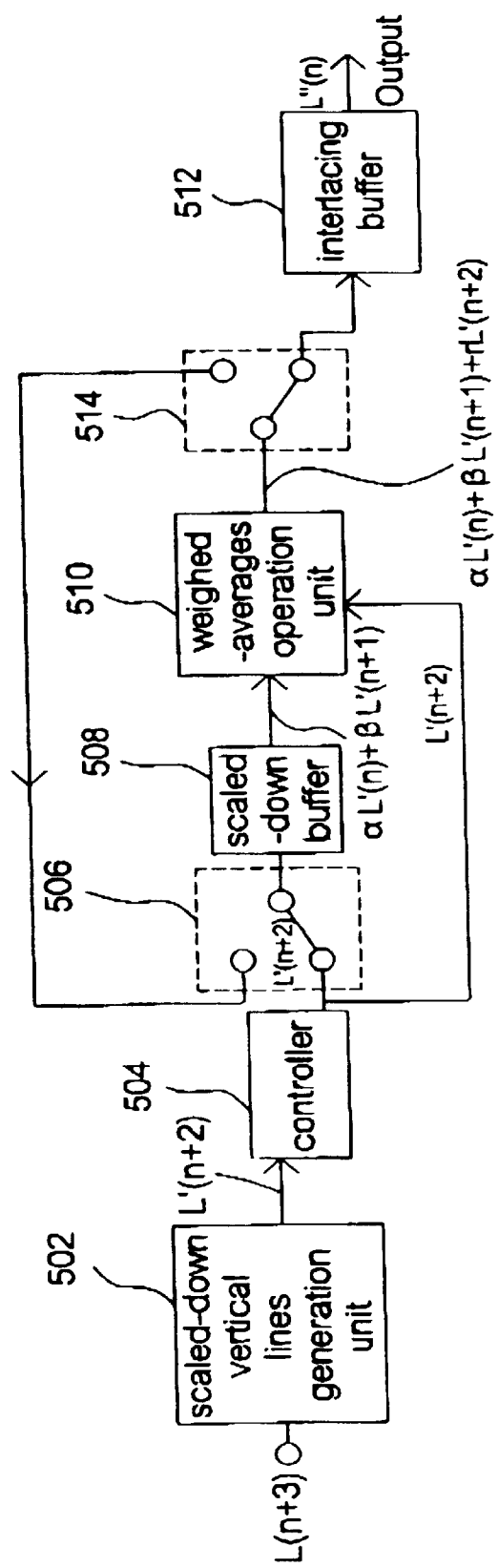

Then, referring to FIG. 6C, after the computer vertical lines L(n+3) has been input to the scaled-down lines generating unit 502, the scaled-down lines generating unit 502 outputs the scaled-down vertical line L'(n+2). Then, the scale-down buffer 508 outputs the content $\alpha L'(n)+\beta L'(n+1)$ to the weighted-averages operation unit 510. Then, by controlling the switch 506, the controller 504 simultaneously outputs the scaled-down vertical line L'(n+2) to the weighted-averages operation unit 510 and to the scaled-down buffer 508. Then, the weighted-averages operation unit 510 performs the weighted-averages operation to the received values, namely, $\alpha L'(n)+\beta L'(n+1)$ and L'(n+2), thereby obtaining the value $\alpha L'(n)+\beta L'(n+1)+\gamma L'(n+2)$. As shown in equation (2), the value $\alpha L'(n)+\beta L'(n+1)+\gamma L'(n+2)$ is the value of the TV line L"(n). Then, the weighted-averages operation unit transmits the value $\alpha L'(n)+\beta L'(n+1)+\gamma L'(n+2)$ to the interlacing buffer 512 through the switch 514, which is regarded as the output of the transforming device 500.

Figure 6D:
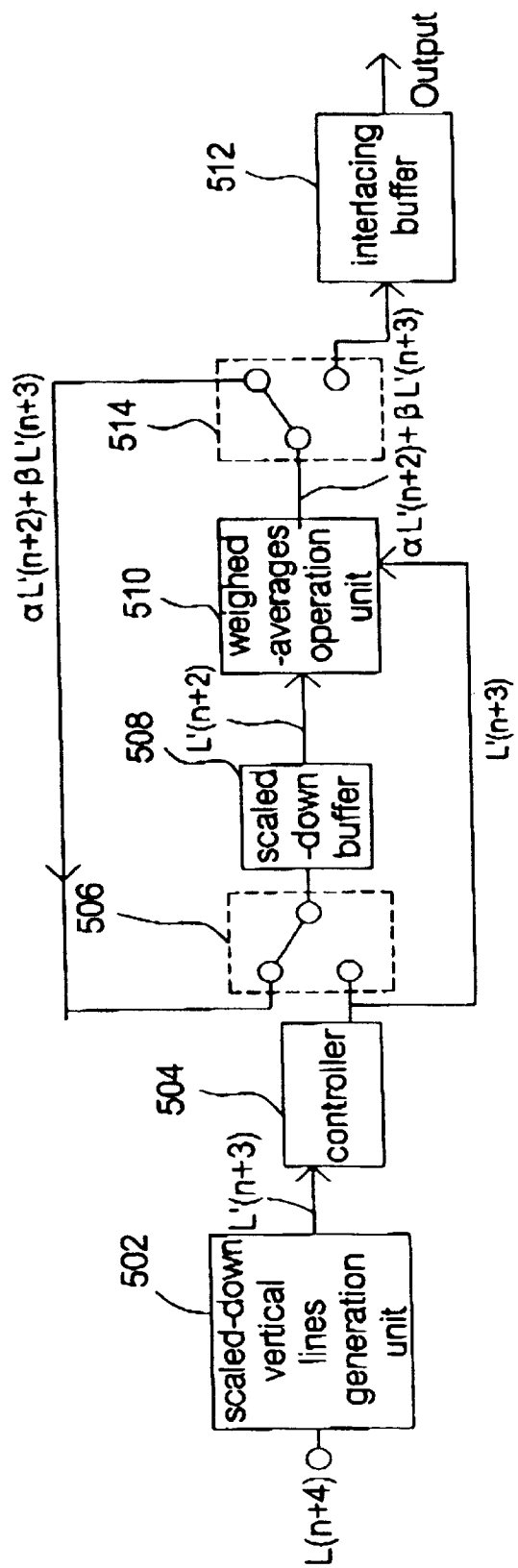

Similarly, in FIG. 6D, after the computer vertical lines L(n+4) has been input to the scaled-down lines generating unit 502, the scaled-down lines production unit 502 outputs the scaled-down vertical line L'(n+3). Then, the scale-down buffer 508 transmits the stored scaled-down line L'(n+2) to the weighted-averages operation unit 510, and simultaneously the controller 504 outputs the scaled-down vertical line L'(n+3) directly to the weighted-averages operation unit 510. Then, the weighted-averages operation unit 510 performs the weighted-averages operation to the received scaled-down lines L'(n+2) and L'(n+3), thereby obtaining the value $\alpha L'(n+2)+\beta L'(n+3)$, which is then stored in the scaled-down buffer 508 through the switch 514 and the switch 506.

Figure 6E:
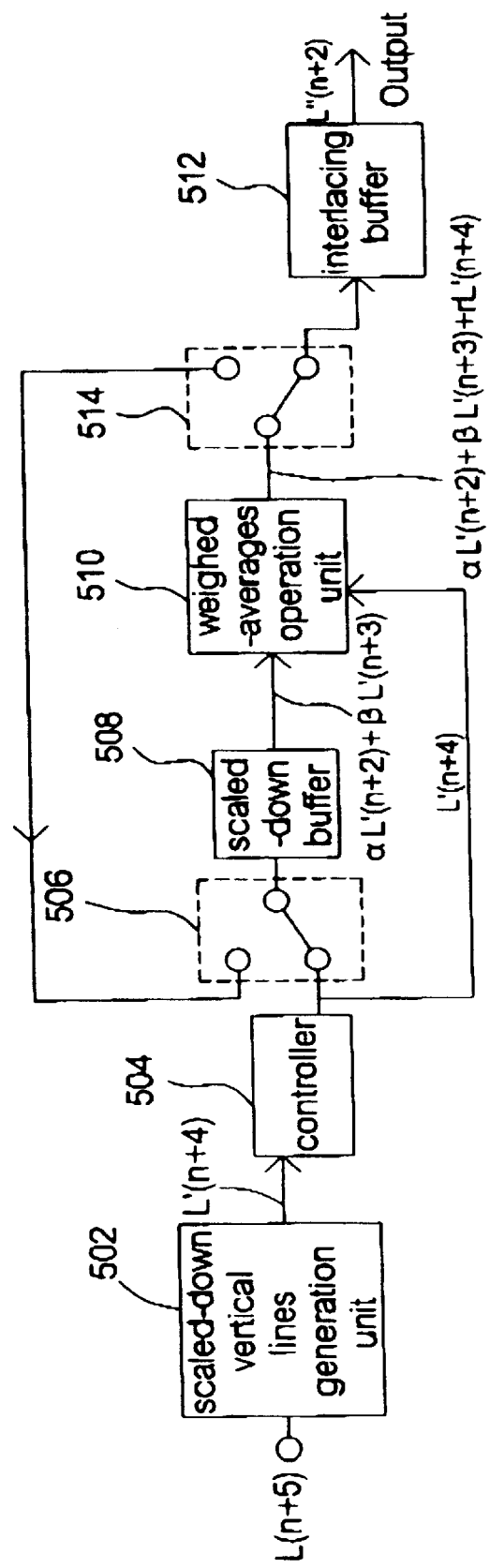

Then, in FIG. 6E, after the computer vertical lines L(n+5) has been input to the scaled-down lines generating unit 502, the scaled-down lines production unit 502 outputs the scaled-down vertical line L'(n+4). Then, the scale-down buffer 508 outputs the content $\beta L'(n+2)+\beta L'(n+3)$ to the weighted-averages operation unit 510. Then, by controlling the switch 506, the controller 504 simultaneously outputs the scaled-down vertical line L'(n+4) to the weighted-averages operation unit 510 and to the scaled-down buffer 508. Then, the weighted-averages operation unit 510 performs the weighted-averages operation to the received values, namely, $\alpha L'(n+2)+\beta L'(n+3)$ and $L'(n+4)$, thereby obtaining the value $\alpha L'(n+2)+\beta L'(n+3)+\gamma L'(n+4)$. As shown in equation (2), the value $\alpha L'(n+2)+\beta L'(n+3)+\gamma L'(n+4)$ is the value of the TV line L"(n+2). Then, the weighted-averages operation unit transmits the value $\alpha L'(n+2)+\beta L'(n+3)+\gamma L'(n+4)$ to the interlacing buffer 512 through the switch 514, which is regarded as the output of the transforming device 500.

FIG. 6B and FIG. 6D are the block diagrams showing the transforming device of the present invention, which is operated at the first operating mode, while FIG. 6C and FIG. 6E are the block diagrams showing the transforming device of the present invention, which is operated at the second operating mode.

Figure 7:
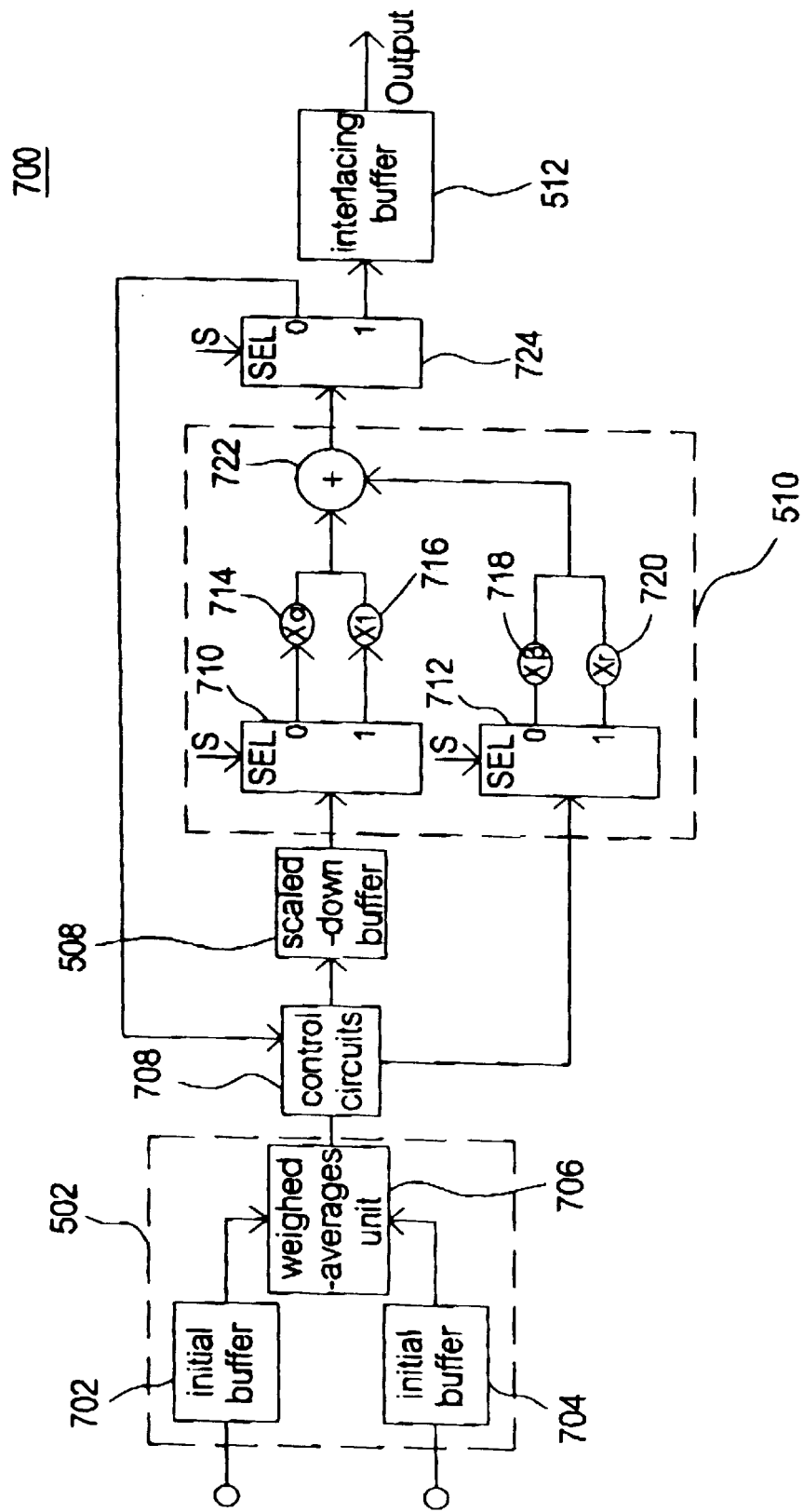
FIG. 7 is a block diagram of circuits, corresponding to an example of the device in FIG. 5, which transforms computer graphics signals to television video signals.

Referring to FIG. 7, which is the block diagram of circuits according to an example of the transforming device 500 in FIG. 5, which transforms computer graphics signals to television video signals. In the transforming device 700, the scaled-down vertical lines generating unit is composed of the initial buffers 702 and 704 and the weighted-averages unit 706. The initial buffers 702 and 704 are employed to store the data of the computer vertical lines. The weighted-averages unit 706 is employed to obtain different scaled-down vertical lines according to the equation (1). The controller 504 and the switch 506 in FIG. 5 are combined to be the control circuits 708.

The scaled-down buffer 508 is employed to store the values of the scaled-down vertical lines, or to store the sums of the scaled-down vertical lines, which have been through the weighted-averages operation. In addition, the weighted-averages operation unit 510 is composed of the de-multiplexers 710, 712, the multipliers 714, 716, 718, 720, and the adder 722. The weighted-averages operation unit is employed to perform the weighted-averages method on the scaled-down vertical lines. The multipliers 714, 716, 718, 720 are respectively employed to perform the operation of multiplying the weighted values $\alpha$, 1, $\beta$, and $\gamma$. The de-multiplexer 710 is employed to select whether the weighted value of the scaled-down vertical line output from the scaled-down buffer 508 is 1 or $\alpha$. The de-multiplexer 712 is employed to select whether the weighted value of the scaled-down vertical line is $\beta$ or $\gamma$. The interlacing buffer 512 is employed to store the value of the TV line. The de-multiplexer 724 is employed to control the result of the weighted-averages operation unit 510 to store in the interlacing buffer 512 as the output signal of the transforming device 700, or to feed it back to the control circuit 708 to store in the scaled-down buffer 508. The control circuit 708 is employed to control whether the scaled-down vertical line output from the weighted-averages unit 706 is transmitted to the scaled-down buffer 508 or the de-multiplexer 712, and to control the output of the de-multiplexer 724 to store in the scaled-down buffer 508.

Referring to FIGS. 6A~6E at the same time, the operating method of the transforming device 700 shown in FIG. 7 is then interpreted as follows. At first, the scaled-down buffer 508 completes the initial setting, that is, set the content as L'(n). Then, during the first clock period, the next computer vertical line is input to the initial buffer 702 or 704, and the weighted-averages unit 706 outputs the scaled-down vertical line L'(n+1) to the control circuit 708. The scaled-down buffer 508 outputs the content L'(n) to the de-multiplexer 710, and the control circuit 708 transmits the scaled-down vertical line L'(n+1) to the de-multiplexer 712. At this time, the selecting signal S of the input-selecting node SEL of the de-multiplexer 712 is 0. Therefore, the weighted-averages operation unit 510 obtains the value $\alpha L'(n)+\beta L'(n+1)$. Then, after being handled by the de-multiplexer 724 and the control circuit 708, the value $\alpha L'(n)+\beta L'(n+1)$ is stored back to the scale-down buffer 508.

During the next clock period, the next computer vertical line is input to the initial buffer 702 or 704, and the weighted-averages unit 706 outputs the scaled-down vertical line L'(n+2) to the control circuit 708. The scaled-down buffer 508 outputs the content $\alpha L'(n)+\beta L'(n+1)$ to the de-multiplexer 710, and the control circuit 708 simultaneously transmits the scaled-down vertical line L'(n+1) both to the scaled-down buffer 508 and to the de-multiplexer 712. At this time, the selecting signal S of the input-selecting node SEL of the de-multiplexer 710 is 0, and so is that of the de-multiplexer 712. Therefore, the weighted-averages operation unit 510 obtains the value $\alpha L'(n)+\beta L'(n+1)+\gamma L'(n+2)$. Then, after being handled by the de-multiplexer 724, the value $\alpha L'(n)+\beta L'(n+1)+\gamma L'(n+2)$ is stored in the interlacing buffer 512 as the output of the transforming device 700. Then, the transforming device 700 repeatedly performs the foregoing operations and therefore transforms all the computer vertical lines to the TV lines.

In FIG. 7, the transforming device 700 of the present invention, which transforms computer graphics signals to television video signals, merely demands 4 buffers, that is, the initial buffers 702, 704, the scaled-down buffer 508, and the interlacing buffer 512. Compared with the 6 buffers needed for the conventional method, the transforming device of the present invention can substantially reduce the memory space needed for the buffers, therefore achieving the goal of reducing the circuit size and the cost.

The foregoing preferred embodiment of the present invention discloses the transforming device for transforming computer graphics signals to television video signals, which possesses the advantage of reducing the needed buffers in the transformation process and therefore reducing the cost.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transforming device for transforming computer graphics signals to television video signals, wherein said transforming device transforms multiple computer vertical lines L of computer graphics signals to multiple TV lines of television video signals and said transforming device contains a first operating mode and a second operating mode, said transforming device comprising:

a scaled-down vertical line generating unit for receiving said computer vertical lines and generating multiple scaled-down vertical lines L'(n), L('n+1), and L'(n+2);

a controller for receiving said scaled-down vertical lines from said scaled-down vertical line generating unit;

a scaled-down buffer with a initial value of said scaled-down line L'(n), wherein said scaled-down buffer outputs content in said second operating mode and said controller transmits said scaled-down vertical line L'(n+2) to said scaled-down buffer;

a weighted-averages operation unit for receiving said content of said scaled-down buffer, wherein said scaled-down buffer transmits said scaled-down line L'(n) to said weighted-averages operation unit in said first operating mode, said controller transmits said scaled-down line L'(n+1) to said weighted-averages operation unit, said weighted-averages operation unit outputs a first value, that is, αL'(n)+βL'(n+1), and said first value is stored to said scaled-down buffer; said weighted-averages operation unit receives said first value transmitted from said scaled-down buffer in said second operating mode, said controller transmits said scaled-down line L'(n+2) to said weighted-averages operation unit, and said weighted-averages operation unit outputs a second value, namely, αL'(n)+βL'(n+1)+γL'(n+2); and an interlacing buffer for connecting said weighted-averages operation unit, wherein said interlacing buffer receives said second value as said output of said transforming device in said second operating mode;

wherein α+β+γ=1.

2. A transforming device according to claim 1, wherein said scaled-down line generating unit comprises:

a first initial buffer and a second initial buffer for storing said data of said computer vertical lines; and a weighted-averages unit for receiving said computer vertical lines and generating said scaled-down vertical lines.

3. A transforming device according to claim 1, wherein said weighted-averages operation unit comprises:

a first multiplier, a second multiplier, a third multiplier, a fourth multiplier that perform said operation of respectively multiplying said weighted value α, 1, β, γ.

4. A transforming device according to claim 3, wherein said weighted-averages operation unit further comprises:

a first de-multiplexer and a second de-multiplexer, wherein said first de-multiplexer is connected with said first multiplier and said second multiplier, said second de-multiplexer is connected with said third multiplier and said fourth multiplier, said first de-multiplexer is for selecting whether said weighted value of said data output from said scaled-down buffer is 1 or α, said second de-multiplexer is for selecting whether said weighted value of said scaled-down vertical line is β or γ;

wherein, said first de-multiplexer selects said weighted value α and said second de-multiplexer selects said weighted value β in said first operating mode, said first de-multiplexer selects said weighted value 1 and said second de-multiplexer selects said weighted value γ in said second operating mode.

5. A transforming device according to claim 4, wherein said weighted-averages operation unit further comprises:

an adder for connecting with said first multiplier, said second multiplier, said third multiplier, said fourth multiplier, wherein said adder outputs said value αL'(n)+βL'(n+1) in said first operating mode and said adder outputs said value αL'(n)+βL'(n+1)+γL'(n+2) in said second operating mode.

6. A transforming device according to claim 1, comprising:

a de-multiplexer for connecting with said weighted-averages unit and storing said data output from said weighted-averages unit to said interlacing buffer as said output signal of said transforming device or feedback storing said data to said scaled-down buffer.

* * * * *